United States Patent [19]

Kearns et al.

[11] Patent Number: 4,783,295

[45] Date of Patent: Nov. 8, 1988

[54] PROCESS FOR PREPARING MOLDED MICROCELLULAR ELASTOMERS

[75] Inventors: James D. Kearns, Charleston, W. Va.; Ronald J. Stapleton, Ypsilanti, Mich.

[73] Assignee: Union Carbide Corporation, Danbury, Conn.

[21] Appl. No.: 809,728

[22] Filed: Dec. 17, 1985

[51] Int. Cl.[4] .................. C08J 9/30; C08G 18/14; B29B 7/04; B29C 45/00

[52] U.S. Cl. .................. 264/50; 264/328.6; 264/DIG. 13; 264/DIG. 83; 422/133; 425/4 R; 425/543

[58] Field of Search ............ 264/51, DIG. 83, 50, 264/DIG. 13, 328.6; 422/133; 425/4 R, 543

[56] References Cited

U.S. PATENT DOCUMENTS

| | | | |
|---|---|---|---|
| 3,882,052 | 5/1975 | Raynor et al. | |
| 4,059,714 | 12/1977 | Scholl et al. | 428/310 |
| 4,156,650 | 5/1979 | Garrett | 210/63 R |
| 4,157,427 | 6/1979 | Ferber | 521/133 |
| 4,288,564 | 9/1981 | Conover | 521/122 |
| 4,396,729 | 8/1983 | Dominquez et al. | 521/51 |
| 4,548,778 | 10/1985 | Holdredge, Jr. | 264/50 |

Primary Examiner—Philip Anderson
Attorney, Agent, or Firm—Paul W. Leuzzi

[57] ABSTRACT

An improved process for producing a molded microcellular elastomer with a reduced number of voids from at least two liquid reactants and a gas, which process comprises introducing into at least one reactant a gas to form an admixture; passing the admixture through a static mixer at superatmospheric pressure; then immediately mixing the admixture with the other reactant at superatmospheric pressure to form a reaction mixture; introducing the reaction mixture into a mold in which the pressure is substantially below the superatmospheric pressures used above; and curing the reaction mixture in the mold to produce a molded microcellular elastomer with a reduced number of large voids.

15 Claims, 1 Drawing Sheet

PROCESS FOR PREPARING MOLDED MICROCELLULAR ELASTOMERS

FIELD OF THE INVENTION

This invention relates to an improved process for preparing molded microcellular elastomers from two or more liquid reactants wherein at least one liquid reactant contains a dispersed gas. In particular, this invention relates to an improved reaction injection molding (RIM) process for producing microcellular elastomers having a reduced number of voids.

BACKGROUND OF THE INVENTION

It is often advantageous to mix a gas with a liquid reactant used in processes for producing molded microcellular elastomers to help promote uniform density, to help completely fill the mold and to help eliminate sink marks in thick molded sections.

Mixing a gas with a reactant is particularly useful in reaction injection molding ("RIM") process. The RIM process involves the high pressure mixing of highly reactive liquid reactants (e.g., polyol and polyisocyanate) in a mixing head to form a reaction mixture and injecting the reaction mixture into a closed mold, generally by using a high output, high pressure dosing apparatus. This high pressure mixing of the liquid reactants is often referred to as "impingement mixing". RIM is particularly suited for forming polyurethane articles such as resilient automobile fascia.

In RIM polyurethane processing, the polyol usually contains a number of additives such as catalysts, surfactants, cross-linking and chain-extending agents and fillers. A gas, such as nitrogen or air, is usually added to the polyol to act as a "blowing agent". The polyol (containing the additives and gas) and the polyisocyanate are separately brought to injection pressure, approximately 1800–2000 psi, and then mixed in the mixing head. The high pressure helps achieve the necessary high speed impingement mixing of the two reactants. At this high pressure, the gas begins to dissolve in the polyol. The degree of dissolution depends upon the time the polyol is held at high pressure. After the impingement mixing, the reaction mixture of the polyol and polyisocyanate travels from the high pressure mixing head to an atmospheric pressure mold. The gas expands due to the reduced pressure in the mold to fill the mold and the reactants react to form a microcellular elastomer of low density and good surface replication.

The prior art describes various means for mixing a gas (which is preferably an inert gas such as nitrogen) with liquid reactants. For example, the gas may be mixed with a liquid reactant by means of a mixing lance or by means of a fast running agitator in the storage container for the reactant. As a further example, the gas may also be added through porous metal plates or injection nozzles via a dosing device into the liquid reactant. As a still further example, the liquid reactant can be circulated from a reactant storage container and the return flow passed through the gas in a gas storage container which is under pressure and thus is absorbed by the reactant.

Various other procedures for mixing a gas and a liquid are described in the prior art. For example, U.S. Pat. No. 4,059,714 describes a process for preparing an adhesive foam by intimately mixing air or an inert gas with a thermoplastic adhesive in a liquid state and then pressurizing the liquid/gas mixture (e.g., 300 psi) to force the gas into solution in the liquid adhesive.

U.S. Pat. No. 4,156,50 describes a process for treating a body of liquid (e.g., aqueous waste material) with a gas, which process comprises passing a stream of the liquid through a conduit, injecting gas intermittently into the stream at high pressure (e.g., above 50 psi) to dissolve at least some of gas in the liquid stream, and introducing the stream containing dissolved gas and undissolved bubbles of gas into the main body of liquid under turbulent conditions such that the undissolved bubbles are shattered into even finer bubbles which dissolve in, or are consumed within, the main body of liquid.

U.S. Pat. No. 4,157,427 describes a process for entraining minute bubbles of a gas into a liquid reactant used in a RIM process for producing molded microcellular polyurethanes. This process consists of continuously removing a small portion of the reactant from a container, passing this portion through a recirculation line wherein minute gas bubbles are introduced under pressure and dispersed from a microporous stone into the flowing portion of the reactant followed by mixing in a mixing device, (e.g., a static mixer) and then returned to the container. When sufficient gas has been entrained, the reactant is delivered from the container to a mixing head, mixed at high pressure with the other reactants and injected into a mold. The entrained gas expands due to the reduced pressure in the mold to fill the mold and form a microcellular article.

U.S. Pat. No. 4,288,564 describes a RIM process for production of microcellular elastomeric molded polyurethane from liquid reactants wherein at least one liquid reactant contains a dissolved gas. An inorganic, finely divided nitrogen absorbing agent (e.g., activated carbon or iron oxide) is added to the gas-containing liquid reactant or reactants to accelerate the transition of the gas from the dissolved state to the dispersed state upon release of the pressure upon introduction of the reactants into a mold. The nitrogen absorbing agent is utilized to eliminate undesirable density variations in the molded elastomer.

U.S. Pat. No. 4,548,776 describes a process for effecting dispersion of a gas within a plastic material to facilitate molding of the plastic material in the form of structural foam. No specific plastic materials are disclosed and only the use of preformed plastic materials are described (not mixtures of reactants). This process involves an arrangement by which molten plastic material, which is to be molded and which contains a gas therein, is injected under "high pressure" (no specific pressures are disclosed) into and drives a rotatably mounted mixing turbine positioned just upstream of the mold assembly. This mixing turbine mixes the gas and plastic material to create the dispersion. This patent states that when the gas is introduced into a plastic material, the microbubbles of gas tend to migrate together to form undesirably large gas bubbles lacking uniformity of size and distribution. The further the gas is introduced into the plastic from the mold, the more the problem is exacerbated. Attempts to enhance the dispersion of the gas in the plastic prior to introduction into the mold have included placing mixing devices in the flow path of the plastic material as it travels to the mold. According to this patent, these attempts have had limited success. For example, this patent states that a static mixer is not effective for maintaining a uniform and fine dispersion of a gas in the plastic material.

It is desired (and often essential) to reduce the formation of large voids in molded microcellular elastomeric products because large voids can result in inferior or defective articles. The prior art techniques for mixing the gas with one or more of the liquid reactants used in preparing molded microcellular elastomers frequently result in the formation of large undesirable voids in the molded product. The use of various means to reduce void formation may entail other problems, even if void formation is reduced. By way of illustration, the use of nitrogen adsorbing agents to eliminate these voids is often undesirable because the agents can abrade certain high pressure metering pumps used in molded microcellular elastomer procedures and so can cause undue wear on these pumps.

Accordingly, it is an object of this invention to provide an improved process for preparing molded microcellular elastomers from two or more liquid reactants wherein at least one liquid reactant contains a dispersed gas.

More particularly, it is an object of the present invention to provide an improved RIM process for making molded microcellular polyurethane elastomers from liquid reactants.

DETAILED DESCRIPTION OF THE DRAWING

Figure 1:
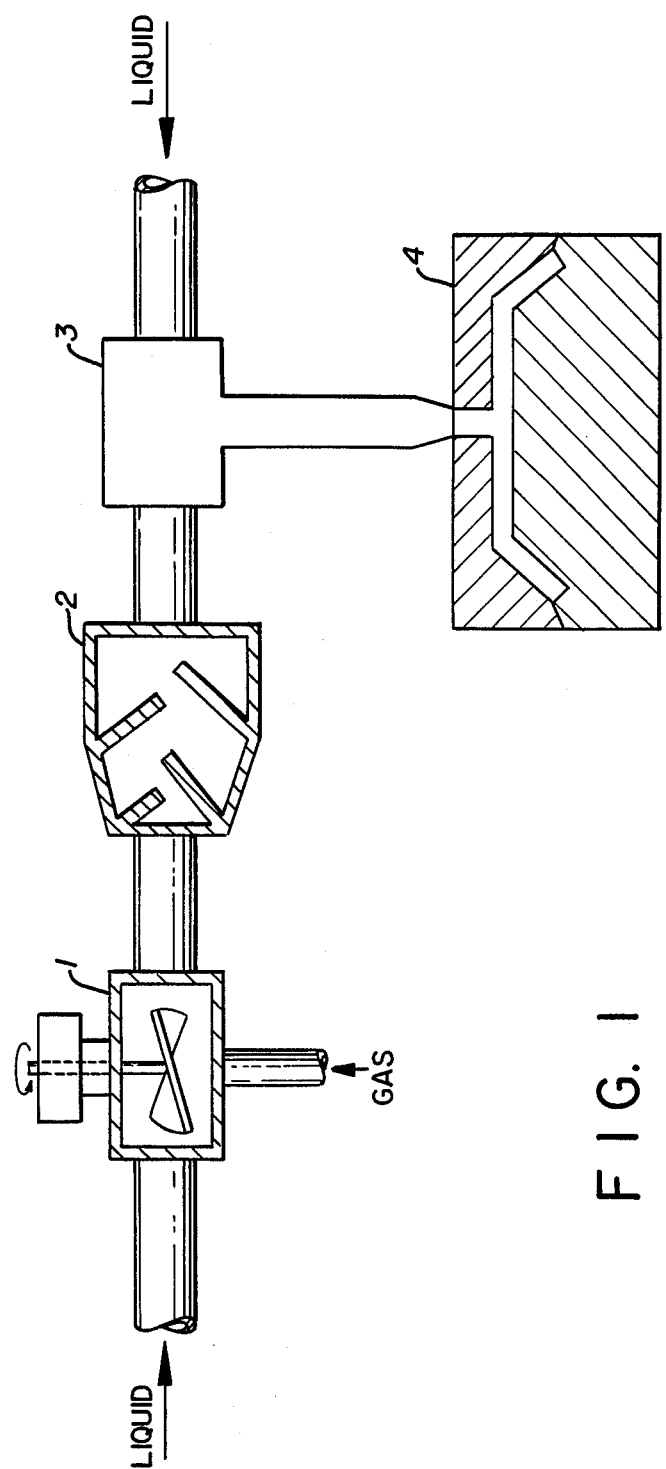
FIG. 1 illustrates an apparatus suitable for practicing the process of the present invention.

FIG. 1 illustrates an apparatus wherein a gas, such as nitrogen, is introduced into a first liquid reactant, such as a polyol, to form a gas-liquid reactant admixture by a gas introducing means (1). The admixture is then passed through a static mixer (2) at superatmospheric pressure. Immediately thereafter the admixture is mixed at superatmospheric pressure with the second liquid reactant, such as a polyisocyanate, in a mixing means (3) to form a reaction mixture. Immediately thereafter the reaction mixture is introduced into a mold (4) in which the pressure is substantially below the pressure in the mixing means (3). The reaction mixture is then cured in the mold (4) to produce a microcellular elastomer with reduced number of large voids.

DESCRIPTION OF THE INVENTION

This invention relates to a process for producing a molded microcellular elastomer with a reduced number of large voids from at least two liquid reactants and a gas which process comprises:
 (a) introducing a gas into at least one of the liquid reactants to form a gas-liquid reactant admixture;
 (b) passing the admixture through a static mixer at superatmospheric pressure;
 (c) immediately mixing the admixture with an additional liquid reactant or reactants at about said superatmospheric pressure to form a reaction mixture;
 (d) immediately introducing the reaction mixture into a mold in which the pressure is substantially below the pressure in (c); and
 (e) curing the reaction mixture in the mold to produce a molded microcellular elastomer with a reduced number of large voids.

The gas useful in the process of this invention is any gas that is nonreactive with the liquid reactants to be utilized. Preferably, the gas utilized is air, helium, or, most preferably, nitrogen. The gas can be introduced into the liquid reactant to form the gas-liquid reactant admixture by any means known to the art. For example, the gas can be "blanketed" into the reservoir tank containing the liquid reactant. Preferably, the gas is introduced into the liquid reactant by a process that consists of continuously removing a small portion of the liquid reactant from its container, passing this portion into a high shearing mixer, passing the gas through a separate line into the high shearing mixer to mix with the liquid reactant, and returning the liquid reactant containing the gas to the liquid reactant container.

The admixture of liquid reactant and gas is passed through a static mixer to enhance the dispersion of gas bubbles within the liquid reactant. Static mixers, in general, consist of a series of stationary, rigid elements arranged in an accomodating housing, such as a pipe, to provide for mixing of a fluid or fluids passed through the static mixer [see, e.g., *Kirk-Othmer Encyclopedia of Chemical Technology*, 3rd Ed., Vol. 15, pp. 623–624 (John Wiley & Son, 1981) and *Chemical Engineer's Handbook*, 5th Ed., Perry, R. H. and Chilton, C. H.-Editors, p. 19–22 and p. 19–24 (McGraw-Hill, 1973).] Static mixers are known in the art and include mesh screens, auger-like helically-arranged vanes, intersecting bars or corrugated sheets, and the like, all lodged in appropriate housings. The static mixer useful in the process of this invention will force the gas and liquid reactant admixture to flow along a sufficiently tortuous path to produce a dispersion of small gas bubbles sufficiently dispersed in the liquid reactant to inhibit the coalescence of the small gas bubbles prior to or during the curing step. Such a dispersion will reduce the number of large (4–5 mm in diameter and larger; preferably, 0.5 mm in diameter and larger) voids in the cured molded microcellular elastomer caused by the coalescence of the gas bubbles. Voids, for the purposes of this invention, are undesirable areas in the molded microcellular elastomer with detrimentally reduced densities compared to the remainder of the elastomer. Preferably, the gas and liquid reactant should be homogeneously mixed in the static mixer to produce minute gas bubbles uniformly dispersed throughout the liquid reactant in the admixture. A preferred static mixer useful in the process of this invention is a static mixer such as a Koch in-line static mixer with SMX mixing elements (Hinkel Co.) wherein a series of intersecting bars are housed in a pipe and arranged at 45° angles to the pipe axis.

The pressure utilized to pass the admixture through the static mixer will vary depending, inter alia, on the desired degree of dissolution of the gas in the reactant, the choice of gas and liquid reactant and the degree of mixing desired between the gas-containing liquid reactant and the remaining reactants. Preferably, the pressure is greater than about 300 psi, more preferably, greater than about 1000 psi and most preferably, between about 1800–2000 psi. The maximum pressure that can be utilized will be determined largely by the pressure limitations of the equipment used but, in general, will be about 2000–3000 psi.

After passing through the static mixer, the admixture is then immediately mixed with the remaining liquid reactant or reactants at superatmospheric pressure to form the reaction mixture. Immediately in this context means less than about 5 seconds and, preferably, less than about 1 second after the admixture has passed through the static mixer. The pressure utilized should be sufficiently high enough to provide for adequate mixing of the reactants and should not vary significantly from the pressure utilized to pass the admixture through the static mixer. Accordingly, the preferred pressure is greater than about 300 psi, more preferably, greater than about 1000 psi, and most preferably between about 1800–2000 psi.

The reaction mixture is then immediately introduced into the mold in which the pressure is substantially less than the pressure utilized to form the reaction mixture. Immediately in this context means less than about 2 seconds, and, preferably, less than about 1 second. The reduced pressure in the mold allows the gas to expand and, inter alia, help fill the mold. The pressure in the mold is preferably less than 50 psi and most preferably, the pressure in the mold is atmospheric pressure. The mold is preferably preheated to a temperature of about 130° F. to about 170° F., more preferably about 145° F. to about 165° F. The reaction mixture is then cured in the mold to produce a molded microcellular elastomer with reduced number of large voids.

Preferred embodiment of the invention relates to a process for producing a RIM molded microcellular elastomer with a reduced number of large voids from at least two RIM liquid reactants and a gas which process comprises:
  (a) introducing a gas, preferably nitrogen, into at least one RIM liquid reactant to form a gas-RIM liquid reactant admixture;
  (b) passinag the admixture through a static mixer at superatmospheric pressure, preferably greater than 1000 psi and most preferably at 1800–2000 psi;
  (c) immediately mixing the admixture with an additional RIM liquid reactant or reactants at about said superatmospheric pressure, preferably greater than about 1000 psi and most preferably at about 1800–2000 psi, to form a reaction mixture;
  (d) immediately introducing the reaction mixture into a mold in which the pressure is substantially lower than the pressure in (c), preferably less than about 50 psi and most preferably at atmospheric pressure; and
  (e) curing the reaction mixture in the mold to produce a RIM molded microcellular elastomer with a reduced number of large voids.

Preferably, the RIM liquid reactants are: (1) a polyol reactant and (2) a polyisocyanate reactant. The polyols useful in the polyol reactant are any polyols which are known in the art for producing polyurethane RIM articles (see, e.g., U.S. Pat. No. 4,288,564), or any polyols which are known in the art for producing polyurea RIM articles (see, e.g., U.S. Pat. No. 4,396,729). The polyol reactant can also contain additives useful for producing polyurethane or polyurea RIM articles, such as catalysts, surfactants, cross-linking agents, chain extending agents, and fillers (see, e.g., U.S. Pat. No. 4,288,564 and U.S. Pat. No. 4,396,729). The polyisocyanates useful in the polyisocyanate reactant are any organic polyisocyanates which are known in the art for producing polyurethane or polyurea RIM articles (see, e.g., U.S. Pat. No. 4,288,564 and U.S. Pat. No. 4,396,279). The polyisocyanate reactant can also contain additives useful for producing polyurethane or polyurea RIM articles, such as those described above for the polyol reactant (provided the additives don't react with the polyisocyanate).

In the most preferred embodiment of this invention, nitrogen is introduced into the polyol reactant to form an admixture in a RIM polyurethane process. This can be accomplished using techniques known in the art such as by using diffuser stone mixers. The admixture and polyisocyanate reactant are then separately brought to superatmospheric pressure and propelled towards the mixing head using displacement cylinders or high pressure metering pumps. In the process of this invention, a static mixture is situated in-line between the displacement cylinder or high pressure metering pump of the admixture and the mixing head such that the admixture must flow through the static mixer at the superatmospheric pressure (about 1800–2000 psi) just prior to entering the mixing head. As a result, the polyol reactant and nitrogen gas are mixed at superatmospheric pressure in the static mixer to form the desired dispersion of nitrogen gas in the polyol reactant immediately prior to entering the mixing head.

As the admixture of polyol and nitrogen gas passes through the static mixer, a pressure drop in the polyol line occurs. High pressure (about 1800–2000 psi) impingement mixing of the polyol and polyisocyanate reactants in the mixing head is desirable to produce an acceptable polyurethane RIM product. Insufficient impingement pressure can result in inadequate mixing and an inferior product. Accordingly, it is preferable to keep the pressure drop in the polyol line as a result of the static mixer to a minimum.

The acceptable level of pressure drop in the static mixer will vary depending on the polyol/nitrogen mixture utilized in the admixture. A method for determining acceptable pressure drop is by using a "critical Reynolds Number" defined by the following equation:

$$Re_c = \frac{\rho V D}{\mu}$$

wherein
  $Re_c$ = critical Reynolds number
  $\rho$ = density of admixture (lbs./ft.$^3$)
  $V$ = velocity of admixture (ft./sec.)
  $D$ = diameter of impinging stream of admixture (ft.)
  $\mu$ = viscosity of admixture (lbs./ft./sec.)

As the pressure drop occurs in the static mixer, a decrease in velocity (V) of the admixture stream occurs. If the pressure drop is too large, V will decrease to a point where $Re_c$ is too low and, consequently, insufficient mixing of the polyol and isocyanate reactants will occur. A $Re_c$ value of 150–200 is preferred [see Lee, et al., "Impingement Mixing in Reaction Injection Molding", *Polymer Engineering and Science*, Vol. 20, No. 13 (1980)]. The pressure drop acceptable will vary depending on the polyol/nitrogen mixture used in the admixture and must be determined experimentally. As a general rule, the pressure drop in the static mixer should be less than 150 psi.

The molded microcellular elastomers produced according to the process of this invention (e.g., molded microcellular polyurea elastomers and molded microcellular polyurethane elastomers) are useful for a variety of applications such as flexible automobile bumpers and automobile body elements, furniture parts and decorative articles. The process of this invention is also useful for preparing microcellular structural foam with a reduced number of large voids. Additionally, the process of this invention is also useful in other applications where a gas is to be utilized in one or more liquid reactants as a blowing agent. For example, this process can be useful in polyurethane slab or molded foam applications if a foam of very low density is desired.

The following Example is presented to illustrate the process of this invention.

The terms and abbreviations used in the example have the following meanings:

PPA  A polymer/polyol sold as NIAX Polyol D-440 by Union Carbide Corporation having at least 70 mole% primary hydroxyl groups, an hydroxyl number of 27.3 and 20.2 wt. % polymer derived from acrylonitrile.

MDI  A diphenylmethane diisocyanate prepolymer having an overall free —NCO content of 21.5%, derived from a polyalkylene oxide triol produced from propylene and ethylene oxides and glycerine having an hydroxyl number of 28, and a diphenylmethane diisocyanate, FNCO=29.3%, the ratio of triol to diisocyanate being 27/73 by weight.

Isocyanate Index  The actual amount of MDI used divided by the theoretically required stoichiometric amount of MDI required to react with all the active hydrogen in the reaction mixture multiplied by 100 [see Bender, Handbook of Foamed Plastics, Lake Publishing Corp., Libertyville, Ill. (1965)].

EXAMPLE

Plaques (50"×25"×0.15") were prepared from a polyol-additive admixture and a polyisocyanate using the RIM process. The polyol-additive admixture used consisted of the following materials plus nitrogen:

| Material | Parts (by weight) |
| --- | --- |
| PPA | 80 |
| Ethylene glycol | 20 |
| Dibutyltindilaurate | 0.1 |

The polyisocyanate used was MDI. Nitrogen was introduced into the polyol-additive admixture tank both as a blanket over the tank and by recirculating the polyol-additive admixture at low pressure through a high shearing mixer into which the nitrogen was introduced through a separate small (⅛") diameter tube leading directly to the mixer.

The plaques were prepared using a Cincinnati Milacron LRM R-15 machine. This machine consisted of separate suppy tanks for the preheated polyol-additive admixture and for the preheated polyisocyanate. Each supply tank was connected by a feed line to its own displacement cylinder. The displacement cylinders acted as metering pumps to draw the reactants from the supply tank and propel the reactants towards a high-pressure impingement mixing head at superatmospheric pressure. A separate feed line led from each displacement cylinder into the mixing head where the admixture and polyisocyanate were mixed and injected into a mold. The mold was preheated and was at atmospheric pressure [see Sweeney, F. M., *Introduction to Reaction Injection Molding*, p. 116 (TECHNOMIC Publishing Co., Inc., 1979)].

The pre-molding material conditions were as follows:
Polyol Specific Gravity: 0.80
Polyol Temperature: 130° F.
Polyisocyanate Temperature: 75° F.
Agitator Speed, Polyol Tank: 135 rpm
All plaques were produced under the following conditions:

| | |
| --- | --- |
| Isocyanate Index | 104 |
| Mold Temperature | 150° F. |
| Injection Rate | 3.5 lb/sec. |
| Mixing Head Diameters | 0.05 in./0.06 in. (polyol-additive admixture/polyisocyanate) |
| Demold time | 30 sec. |

RIM plaques were prepared with and without a static mixer placed in-line on the polyol-additive admixture feed line between the displacement cylinder and the mixing head. The static mixer used was a Koch static mixer (Hinkel Co.), 1" diameter×6" length, containing 4 SMX mixing elements (i.e., a series of intersecting bars arranged at 45° angles to the pipe axis) housed within a schedule 40 pipe rated for a maximal allowable working pressure of 2010 psi. The pressure drop across the mixer was 80 psi. Both the admixture and polyisocyanate reactant were propelled towards the mixing head at 1800 psi. The time interval between the polyol-additive admixture passing through the static mixer and entering the mixing head was less than 1 second. The time interval between the admixture and the polyisocyanate entering the mixing head and injection of the admixture-polyisocyanate reaction mixture into the mold was less than 1 second.

Three sets of experiments were performed. Experiment A was conducted on two different days. A static mixer was used on the first day to mix the nitrogen and polyol-additive admixture. No static mixer was used on the second day. Experiment B was conducted in one day. First plaques were prepared without using a static mixer to mix the nitrogen and polyol-additive admixture and then plaques were prepared using a static mixer. Experiment C was conducted in one day and one part of L-540 (a silicone surfactant sold by Union Carbide Corporation) per hundred parts by weight of polyol was also present in the polyol-additive admixture. First, plaques were prepared using a static mixer to mix the polyol-additive admixture and the nitrogen and then plaques were prepared without a static mixer.

After the plaques were formed in each experiment, the voids in the plaques were visually detected and counted by laying each plaque on a light box containing 40 watt fluorescent bulbs in the absence of extraneous lighting. This procedure allowed for the detection of voids in the plaques as small as 0.5 mm in diameter. This procedure is a significantly more critical evaluation of void formation in the plaques than procedures generally used in the art which, as a general rule, only allow for the detection of voids 4–5 mm in diameter and larger. The higher the number of voids detected in a plaque, the poorer the quality of the plaque. The results are shown in Table 1 below.

TABLE 1

| | Number of Voids in Plaque* | | % Decrease In Number |
| --- | --- | --- | --- |
| Experiment | Without Mixer | With Mixer | of Voids |
| A | 253 | 110 | 56.5 |
| B | 158 | 116 | 26.5 |
| C | 82 | 25 | 69.5 |

This Example illustrates that, when a static mixer is utilized to mix the polyol-additive admixture and nitrogen prior to mixing with the polyisocyanate in accordance with the process of this invention, the plaques formed therefrom contained significantly fewer voids.

What is claimed is:

1. A process for producing a molded microcellular elastomer with a reduced number of large voids from at least two liquid reactants and a gas which process consists essentially of:
   (a) introducing a gas into at least one of the liquid reactants to form a gas-liquid reactant admixture;
   (b) passing the admixture through a static mixer at superatmospheric pressure;
   (c) within about one second after step (b) mixing the admixture with an additional liquid reactant or reactants at about said superatmospheric pressure to form a reaction mixture;
   (d) within about one second after step (c) introducing the reaction mixture into a mold in which the pressure is substantially below the pressure in (c); and
   (e) curing the reaction mixture in the mold to produce a molded microcellular elastomer with a reduced number of large voids.

2. A process as recited in claim 1 wherein steps (b) and (c) are conducted at a pressure greater than about 300 psi.

3. A process as recited in claim 1 wherein steps (b) and (c) are conducted at a pressure greater than about 1000 psi.

4. A process as recited in claim 1 wherein steps (b) and (c) are conducted at a pressure between about 1800–2000 psi.

5. A process as recited in claim 1 wherein step (d) is conducted at a pressure less than about 50 psi.

6. A process as recited in claim 1 wherein step (d) is conducted at atmospheric pressure.

7. A process as recited in claim 1 wherein the static mixer is a series of intersecting bars housed in a pipe wherein the bars are arranged at 45° angles to the pipe axis.

8. A process for producing a molded microcellular elastomer by reaction injection molding from at least two liquid reactants useful in such molding and a gas which process consists essentially of:
   (a) introducing a gas into at least one of the liquid reactants to form a gas-liquid reactant admixture;
   (b) passing the admixture through a static mixer at superatmospheric pressure;
   (c) within about one second after step (b) mixing the admixture with an additional liquid reactant or reactants at about said superatmospheric pressure to form a reaction mixture;
   (d) within about one second after step (c) introducing the reaction mixture into a mold in which the pressure is substantially below the pressure in (c); and
   (e) curing the reaction mixture in the mold to produce a molded microcellular elastomer with a reduced number of large voids.

9. A process as recited in claim 8 wherein the liquid reactant used in (a) is polyol and the liquid reactant used in (c) is polyisocyanate.

10. A process as recited in claim 8 wherein the liquid reactant used in step (a) is polyisocyanate and the liquid reactant used in step (c) is polyol.

11. A process as recited in claim 8 wherein steps (b) and (c) are conducted at a pressure greater than about 1000 psi.

12. A process as recited in claim 8 wherein steps (a) and (b) are conducted at a pressure between about 1800–2000 psi.

13. A process as recited in claim 8 wherein the gas is nitrogen.

14. A process as recited in claim 8 wherein step (d) is conducted at atmospheric pressure.

15. A process as recited in claim 8 wherein the static mixer is a series of intersecting bars housed in a pipe wherein the bars are arranged at 45° angles to the pipe axis.

* * * * *